UNITED STATES PATENT OFFICE.

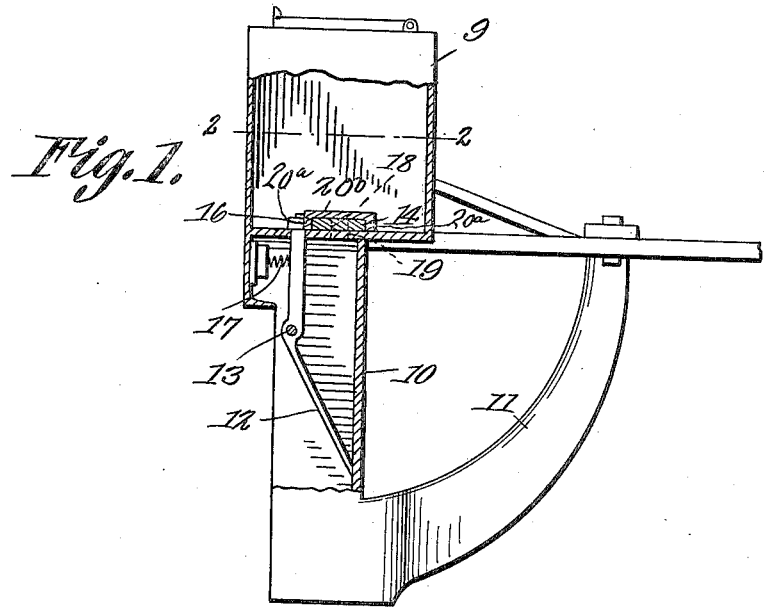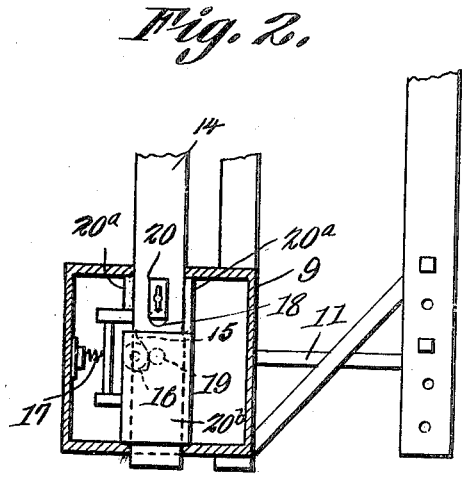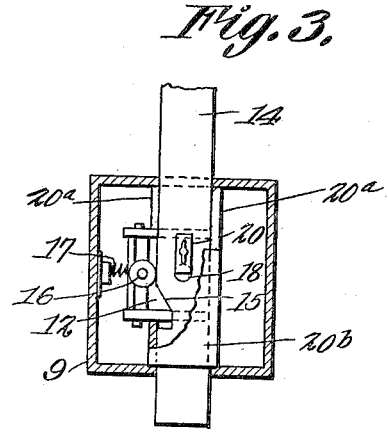

THOMAS J. ELLISON, OF TERRILL, KENTUCKY.

SEED-DROPPING MECHANISM.

1,342,948.  Specification of Letters Patent.  Patented June 8, 1920.

Application filed July 6, 1918. Serial No. 243,658.

*To all whom it may concern:*

Be it known that I, THOMAS J. ELLISON, a citizen of the United States, residing at Terrill, in the county of Madison and State of Kentucky, have invented certain new and useful Improvements in Seed-Dropping Mechanism, of which the following is a specification.

This invention relates to corn planters and more particularly to the seed-dropping mechanism.

It is the object of the invention to provide a novel and improved seed dropping mechanism as will be described in detail hereinafter and claimed, and in order that the invention may be better understood, reference is had to the accompanying drawing forming a part of this specification.

In the drawing, Figure 1 is a side elevation of the seed box and the parts associated therewith, partly in section;

Fig. 2 is a horizontal section on the line 2—2 of Fig. 1, and

Fig. 3 is a similar view with certain parts broken away.

Referring specifically to the drawings, 9 denotes one of the seed boxes of a corn planter, from which depends a seed chute 10 extending down to a furrow opener 11 as usual. In the seed chute is mounted a valve 12 pivoted intermediate its ends, as shown at 13 and having its upper end located opposite one edge of a horizontal slide bar 14 provided in said edge with a cam recess 15. The last-mentioned end of the valve has an anti-friction roller 16 engaging the cam edge of the slide bar. When the bar 10 is reciprocated, the valve 12 is rocked by the movement of the roller 16 into and out of the recess 15. The valve 12 is backed by a spring 17 which tends to urge its upper end toward the bar 14, so that when the recess 15 comes opposite the roller 16, the latter enters the recess and the upper end of the valve therefore tilts forward, whereupon its rear end tilts back to open position, and allows the seed resting thereon to drop. In the bar 14 is an opening 18, which latter, when the valve is in closed position, registers with the outlet 19 of the seed box 9 into the chute 10, and allows the seed to drop down the chute onto the valve. The bar 14 then moves back to cover the outlet 19, shutting off the flow of seed to the valve, and the latter now opens and allows the seed resting thereon to drop to the ground. The area of the opening 18 may be varied by a slide 20 carried by the bar 14, thereby regulating the quantity of seed delivered to the valve at each operation. In the seed box are parallel guide strips 20$^a$ between which the bar 14 slides, and above the outlet 19 the guide strips are connected by a plate 20$^b$ under which the bar slides, said plate serving as a hood to prevent the seed from flowing into the outlet 19 except when the opening 18 registers therewith. The seed is therefore discharged in measured quantities.

The means for operating the slide bar 14 are disclosed in a previous application filed July 14, 1916, and maturing into Patent No. 1233208, dated July 10, 1917, and therefore need not again be described in the present application.

I claim:

In a planter, a seed box having a bottom provided with an outlet, a slide bar working in the seed box on the bottom thereof and over the outlet, and having an opening adapted to register with the outlet, operating means for the slide bar, upstanding guide strips on the bottom of the seed box between which the slide bar works, and a plate extending across the guide strips at the top thereof above the slide bar, and positioned above the seed box outlet, said plate covering a portion only of the slide bar to leave the opening thereof exposed at the end of the stroke of the bar in one direction, and said opening passing beneath the plate on the opposite stroke of the bar.

In testimony whereof I hereby affix my signature.

THOMAS J. ELLISON.